United States Patent [15] 3,682,506
Bruyere et al. [45] Aug. 8, 1972

[54] COUPLING DEVICES

[72] Inventors: Martin Francois Marcel Bruyere, 109, rue Litolff 92 Bois-Colombes; Henri Chatelet, 153, Avenue de Clichy, 75 Paris, both of France

[73] Assignee: Societe Nationale d'Etude et de Construction de Moteurs d'Aviation, Paris, France

[22] Filed: Feb. 10, 1971

[21] Appl. No.: 114,298

[30] Foreign Application Priority Data

Feb. 24, 1970 France...................7006561

[52] U.S. Cl.................287/108, 285/315, 192/114 R
[51] Int. Cl..............................................F16d 1/00
[58] Field of Search ......287/108, 119; 285/315, 316; 85/5 B; 279/75, 82, 22, 30, 81; 192/114 R, 67 R; 64/23

[56] References Cited

UNITED STATES PATENTS

| 1,936,713 | 11/1933 | Freeman et al............192/114 |
| 2,108,866 | 2/1938 | Mandl.....................287/119 R |
| 3,260,541 | 7/1966 | Sadler et al.............287/53 SS |
| 2,959,943 | 11/1960 | Allen...............................64/9 |

Primary Examiner—Andrew V. Kundrat
Attorney—Larson, Taylor and Hinds

[57] ABSTRACT

The coupling device comprises two coaxial shaft elements and a coupling sleeve. The coupling sleeve is axially locked in its coupled position by two radial bolts arranged in one of the two shaft elements and urged outwardly by a spring, each radial bolt coming into abutment against a ball which is supported against an outer ring. Such a coupling device can be applied to connect the motor with an auxiliaries coupling box.

10 Claims, 3 Drawing Figures

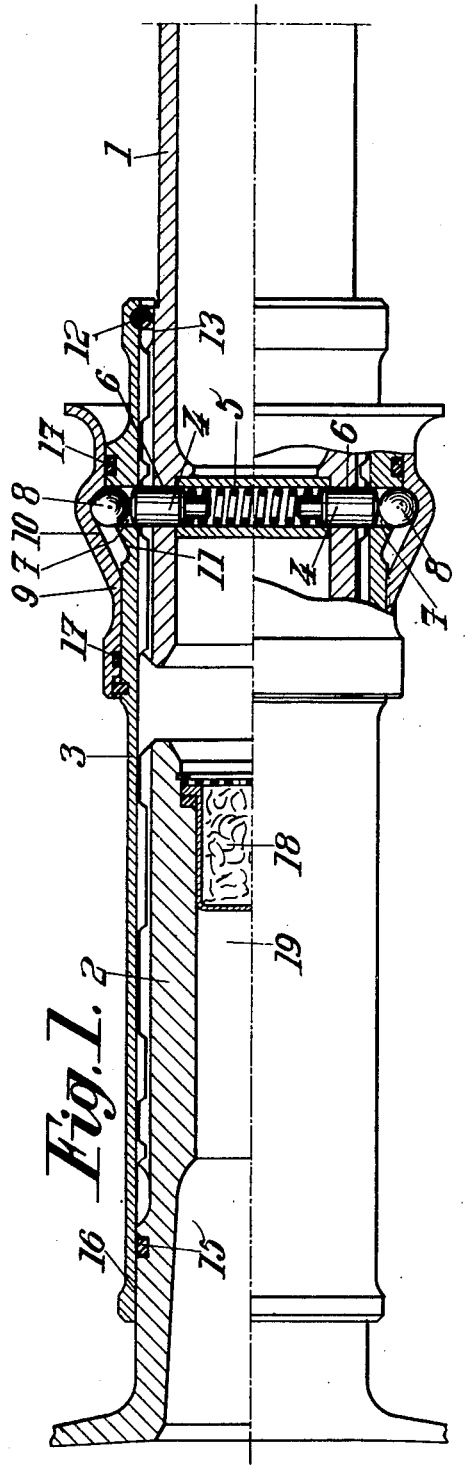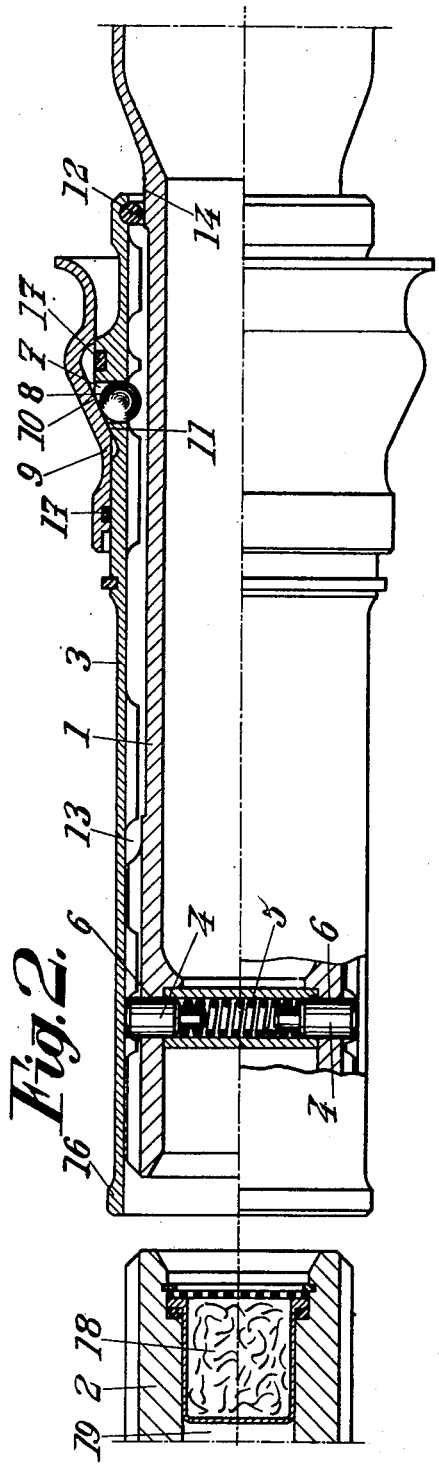

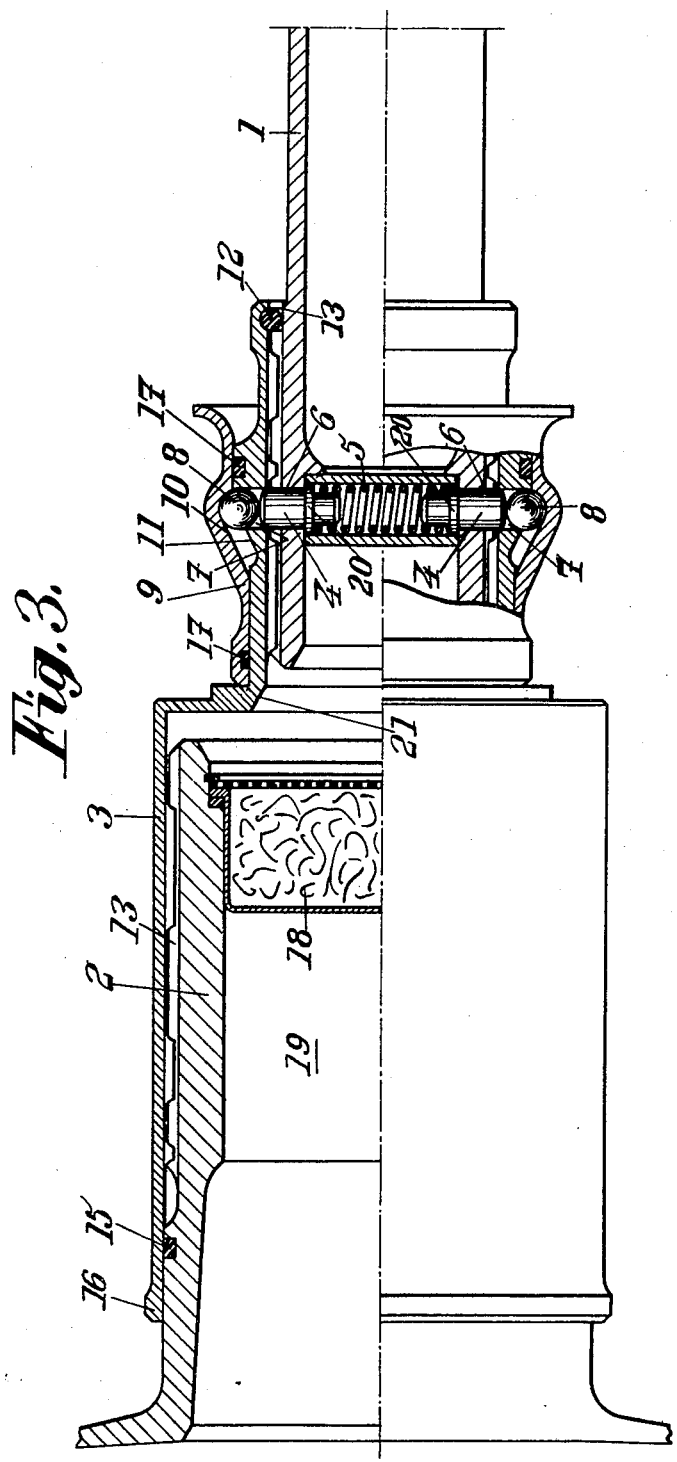

COUPLING DEVICES

The invention relates to coupling devices intended to couple two coaxially arranged shaft elements, through a coupling sleeve slidably mounted on one of the two shaft elements, these two shaft elements being each provided with at least one axial groove, whilst the coupling sleeve is provided with at least one projection engaged in the axial groove of the shaft element on which it slides and adapted to be engaged also in the axial groove of the other shaft element on translation of the said coupling sleeve towards this other shaft element.

The problem then consists of axially locking the coupling sleeve in the position in which the projection that it possesses is engaged in the axial grooves of the two shaft elements (coupled position).

The invention relates more particularly, because it is in this case that its application seems to offer the most advantages, but not exclusively, among these coupling devices, to those intended to connect a motor and a coupling box for auxiliary devices, since the "telescopic" character of such a coupling device enables the coupling and uncoupling with ease of the motor and the auxiliaries box once these two elements are placed in position.

More particularly also the application of the invention shows itself to be advantageous in the case where it relates to a turboreactor which is introduced longitudinally into a nacelle also shielding the auxiliaries box, and in which access to the coupling device between this turboreactor and this auxiliaries box is very restricted.

It is an object of the invention to provide a coupling device which can be manipulated, to pass from its coupled position to its uncoupled position, and conversely, by a single axial movement of the operator's hand.

The coupling device according to the invention comprises, two coaxial shaft elements, each provided with at least one axial groove, and a coupling sleeve slidably mounted on one of the two shaft elements and provided with at least one projection engaged in the axial groove of the shaft element on which it slides and adapted to be engaged also in the axial groove of the other shaft element, and it is characterized by the fact that, the coupling sleeve is axially locked in its position for which the projection is engaged in the axial grooves of the two shaft elements (coupled position) by at least one radial bolt arranged in one of the two shaft elements and urged outwardly by elastic return means, this radial bolt being guided in an orifice arranged in the shaft element concerned and extending into a facing orifice arranged in the coupling sleeve, the radial bolt comes into abutment against a pusher which is supported against an outer ring slidably mounted on the coupling sleeve, the outer ring has a ramp oriented to depress, on translation of this outer ring in the direction of the shaft element on which the coupling is slidably mounted, the pusher with a view to returning it inwardly and to depress the radial bolt against the action of the elastic return means by a distance such that it no longer extends into the orifice arranged in the coupling sleeve, whilst again being flush with the surface of the shaft element, the outer ring having also a stop arranged to cooperate, on translation of this outer ring always in the direction of the shaft element on which the coupling sleeve is slidably mounted, with a stop arranged on the coupling sleeve to impel it in the direction of the shaft element on which it is slidably mounted, and to cause the uncoupling of the coupling device.

The invention consists, apart from this main feature, of certain other features which are preferably used at the same time and which will be more explicitly considered below.

In order that the invention may be more fully understood, a preferred embodiment of a coupling device according to the invention is described below, purely by way of illustrative but non-limiting example, with reference to the accompanying drawings, in which:

FIG. 1 shows a half-section with a portion removed of one embodiment of a coupling device according to the invention, shown in its coupled position;

FIG. 2, shows under the same conditions, the embodiment of FIG. 1 in its uncoupled position; and FIG. 3 is a variation of the embodiment of the coupling device, illustrated in FIG. 1.

As shown in FIGS. 1 to 3, the coupling device comprises, two coaxial shaft elements 1 and 2, each provided with axial grooves forming male splines, and a coupling sleeve 3 slidably mounted on the shaft element 1 and provided with female splines engaged in the male splines of the shaft element 1, and adapted to be engaged also in the male splines of the other element of the shaft 2 on translation of the said coupling sleeve 3 towards this shaft element 2.

The coupling sleeve 3 is axially locked in its position for which its female splines are engaged in the male splines of the two shaft elements 1 and 2 (coupled position) by two diametrically opposite radial bolts 4, arranged in one of the two shaft elements 1 and 2 and urged outwardly by a spring 5; these radial bolts 4 being each guided in an orifice 6 arranged in the shaft element 1 or 2 concerned and extending into a facing orifice 7 arranged in the coupling sleeve 3.

Preferably, these two bolts 4 are arranged in the shaft element 1, on which the coupling sleeve 3 is slidably mounted.

Each radial bolt 4 comes into abutment against a pusher, constituted advantageously by a ball 8 which is urged against an outer ring 9 slidably mounted on the coupling sleeve 3.

The outer ring 9 has a ramp 10 oriented to depress two balls 8 on a translation of this outer ring 9 in the direction of the shaft element 1 on which the coupling sleeve 3 is slidably mounted, so as to return them inwardly and to depress the radial bolts 4 against the action of the spring 5 and this by distance such that they no longer extend into the two orifices 7 arranged in the coupling sleeve 3, and again become flush with the surface in the two orifices 6 arranged in the shaft element 1. In this way subsequent locking by the balls 8 is avoided. In this regard, the constitution of the pushers by balls reduces the risk of locking since even if a ball extends slightly from the orifice 7 arranged in the coupling sleeve 3, it is pushed back into the orifice, due to its spherical shape, as soon as a translation of the said coupling sleeve occurs.

The outer ring 9 has also a stop arranged to cooperate, on translation of this outer ring 9 always in the direction of the shaft element 1 on which the coupling sleeve 3 is slidably mounted, with a stop arranged on the coupling sleeve to impel it in the direction of the shaft element 1 on which it is slidably mounted.

Under these conditions, the manipulation of the outer ring 9 causes first the unlocking of the coupling sleeve 3, then its translation on the shaft element 1 on which it slides, this translation ensuring the uncoupling of the device.

Advantageously, the coupling sleeve 3 comprises a ramp 11, oriented parallel to the ramp 10 of the outer ring 9, this ramp 11 being arranged so as to limit the travel of the outer ring 9 on the coupling sleeve 3 to limit the depression of the two balls 8.

Under these conditions, the driving of the coupling sleeve 3 by the outer ring 9 is caused by the ramp 10 of this outer ring 9 coming to be supported on the ramp 11 of the coupling sleeve 3.

The end of the coupling sleeve 3 turned on the side of the shaft element 1 on which it is slidably mounted comprises a sealing lining 12 which cooperates, in coupled position with a collar 13 of the shaft element 1, and in uncoupled position with a collar 14 of the shaft element 1.

In the coupled position (FIG. 1), there is thus obtained a fluid-tightness of the device, between this sealing lining 12 and the collar 13, and, at the other end of the coupling sleeve 3, between a sealing lining 15 (mounted for example on the shaft element 2) and a collar 16 (then arranged in the coupling sleeve 3).

In the uncoupled position (FIG. 2), the frictional forces of the sealing lining 12 on the collar 14 immobilize the coupling sleeve 3 on the shaft element 1.

Sealing elements 17 are provided between the outer ring 9 and the coupling sleeve 3 on both sides of the bolt and ball locking device 4,8, which enables complete fluid-tightness of the device in the coupled position to be obtained, hence efficient protection of the splines and of the locking assembly.

Under these conditions, a reserve of grease 18 can be disposed in an axial cavity 19 fashioned in one of the two shaft elements, this grease being then centrifuged when the device turns, to distribute it in the splines and the locking assembly (FIGS. 1 and 2).

As regards the respective diameters of the shaft elements 1 and 2, they can be identical (according to the embodiments of the invention illustrated in FIGS. 1 and 2) or different (according to the embodiment of the invention illustrated in FIG. 3).

In the latter case, it is advantageous to mount the coupling sleeve 3 slidably on the shaft element which has the smallest diameter, which enables the two shaft elements to be arranged as close as possible to one another. It is then preferable to make each radial bolt 4 include a stop shoulder 20 limiting their outward position when the coupling sleeve 3 is desengaged from the shaft element of largest diameter, a chamfer 21 being provided on the coupling sleeve 3 for the depression of the bolts 4 on the engagement of the coupling sleeve 3 on the shaft element of largest diameter.

Finally, the coupling device according to the invention has a certain number of advantage among which may be indicated those summarized by the following points:

the manipulation of the coupling device can be effected by a single axial movement of the operator's hand without the operator being obliged to see the device;

the coupling device is of positive operation, since once the coupling sleeve is locked in coupled position, the centrifugal force exerted on the radial bolts prevents any accidental unlocking, even if the device is the site of radial vibrations;

the coupling device is fluid-tight and can hence be lubricated efficiently during its operation in couple position; and the coupling device is immobilized in uncoupled position, which holds it in place during operations on the motor or on the coupling box for auxiliaries.

As is self-evident and as emerges already from the preceding description, the invention is in no way limited to those of its methods of application, nor to those of its methods of production of its various parts, which have been more especially indicated; it embraces, on the contrary, all variations.

We claim:

1. Coupling device comprising,
   two coaxial shafts each provided with at least one axial groove,
   a coupling sleeve slidably mounted on one of the two shafts and provided with at least one projection engaged in the axial groove on the shaft on which it slides and adapted to be engaged also in the axial groove of the other shaft,
   at least one radial orifice arranged in one shaft, a radial bolt arranged and guided in said orifice, elastic return means urging said radial bolt outwardly, an orifice into which said radial bolt can extend arranged in the coupling sleeve facing said shaft element orifice, at least one said radial bolt being capable of axially locking the coupling sleeve in its position for which the projection is engaged in the axial grooves of the two shafts (coupled position),
   an outer ring slidably mounted on the coupling sleeve, a pusher element supported against said outer ring, the radial bolt abutting against said pusher element, the outer ring having a ramp oriented so as to depress the pusher element inwardly on translation of the outer ring in the direction of the shaft on which the coupling sleeve is slidably mounted, so as to return the pusher element inwardly and to depress the radial bolt against the action of the elastic return means by a distance such that the bolt no longer extends into the orifice in the coupling sleeve and is flush with the surface of the shaft,
   the outer ring having a stop arranged to cooperate, on translation of the outer ring in the direction of the shaft on which the coupling sleeve is slidably mounted, with a stop arranged on the coupling sleeve to move said sleeve in the direction of the shaft on which it is slidably mounted.

2. Coupling device according to claim 1, wherein the two shafts and the coupling sleeve are splined to form said projection and axial grooves.

3. Coupling device according to claim 1, wherein two diametrically opposite radial bolts are provided, said two radial bolts being arranged in the shaft on which the coupling sleeve slides.

4. Coupling device according to claim 1, wherein the pusher is constituted by a ball.

5. Coupling device according to claim 1 wherein the stop of the outer ring is constituted by said ramp which cooperates with the pusher, and the stop of the coupling sleeve is constituted by a ramp parallel to the ramp of the outer ring.

6. Coupling device according to claim 5, wherein said sleeve ramp is arranged so as to limit the travel of the outer ring on the coupling sleeve to limit the depression of the pusher.

7. Coupling device according to claim 1, wherein sealing linings are provided between the shafts and the coupling sleeve, and between the coupling sleeve and the outer ring.

8. Coupling device according to claim 1, wherein the two shafts have the same diameter.

9. Coupling device according to claim 1, wherein the two shafts have different diameters.

10. Coupling device according to claim 9, wherein the coupling sleeve is slidably mounted on the shaft of smallest diameter.

* * * * *